(12) United States Patent
Cole

(10) Patent No.: US 6,305,517 B1
(45) Date of Patent: Oct. 23, 2001

(54) LOCATING RING AND GROOVE CONFIGURATION FOR USE WITH AXIALLY STACKED TORQUE TRANSMITTING MECHANISMS IN A POWER TRANSMISSION

(75) Inventor: Jeffrey Jay Cole, Plainfield, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/578,801

(22) Filed: May 23, 2000

(51) Int. Cl.[7] ............................. F16D 13/54; F16D 13/68; F16D 47/00
(52) U.S. Cl. ................. 192/48.91; 192/70.2; 192/87.15; 192/109 R
(58) Field of Search ............................. 192/87.15, 87.14, 192/87.11, 85 AA, 48.91, 70.2, 109 R; 403/DIG. 7

(56) References Cited

U.S. PATENT DOCUMENTS 3,772,940 * 11/1973 Ohtsuka et al. ............... 192/87.15 X
6,193,042 * 2/2001 Kempf et al. .................... 192/85 AA

FOREIGN PATENT DOCUMENTS 58-207533 * 12/1983 (JP) ........................ 192/85 AA

* cited by examiner

Primary Examiner—Rodney H. Bonck
(74) Attorney, Agent, or Firm—Laura C. Hargitt; Leslie C. Hodges

(57) ABSTRACT

A power transmission has axially aligned torque transmitting mechanisms. Each torque transmitting mechanism has a backing plate slidably disposed on a spline formed in the housing of the power transmission. Each backing plate has a locating ring to limit the axial movement of the backing plate and therefore the members of the torque transmitting mechanism during engagement. The locating rings are disposed in an L-shaped groove such that the outer locating ring is narrower that the inner locating ring. The backing plate of one of the torque transmitting mechanisms has an outer segmented annular extension that is aligned with the narrower locating ring to prevent interference between the backing plates when the one torque transmitting mechanism is engaging. The backing plate of the other torque transmitting mechanism is limited in axial movement by the wider locating ring which prevents contact between the backing plate and the narrow locating ring, thus preventing interference between the backing plates when the other torque transmitting mechanism is engaging.

3 Claims, 3 Drawing Sheets

LOCATING RING AND GROOVE CONFIGURATION FOR USE WITH AXIALLY STACKED TORQUE TRANSMITTING MECHANISMS IN A POWER TRANSMISSION

TECHNICAL FIELD

This invention relates to assembly structures for power transmissions and more particularly to locating ring and groove structures

BACKGROUND OF THE INVENTION

Many of the power transmissions in use today have a plurality of stationary torque transmitting mechanisms or brakes which are operated to establish one or more gear ratios in the transmission. Each of the torque transmitting mechanisms has a backing plate that is positioned in a transmission housing by a locating ring and groove structure. The locating ring cooperates with a wall of the groove to determine the axial position of the backing plate when the torque transmitting mechanism is engaged.

In some of the power transmissions, the backing plates are positioned in the housing in axial adjacent relation. In these instances it has been common practice to use a single locating ring to establish the operating position of the backing plates. However, when the torque transmitting mechanisms are engaged and disengaged to control sequential gear ratios, the axial movement of the backing plates can produce a disturbance in the torque transmission during a ratio interchange.

During the ratio interchange, the backing plate of the oncoming torque transmitting mechanism is being urged against the locating ring as the torque capacity of the oncoming torque transmitting mechanism is increasing. However, the backing plate of the offgoing torque transmitting mechanism will also be applying a force to the locating ring that is opposite the force of the oncoming torque transmitting mechanism. Since some assembly tolerance is present between the locating ring and the groove side walls the locating ring will move axially during the ratio interchange as the force balance on the locating ring changes.

This axial movement of the locating ring can disturb the shift timing by effectively increasing the fill time of the oncoming torque transmitting mechanism and prevent the offgoing torque transmitting mechanism from exhausting at the design rate. As a result of the axial movement of the locating ring, the torque transmitting mechanisms can experience excess overlap time during the ratio interchange or reduced capacity of the oncoming torque transmitting mechanism which results in a slight speed flare of the power source. The later of these undesirable episodes can affect the adaptive algorithms of the electronic control system that continually monitors and corrects the ratio interchange timing.

SUMMARY OF THE INVENTION

It is an object of the present invention to provide an improved locating ring and groove structure for axially stacked torque transmitting mechanisms in a power transmission.

In one aspect of the present invention, an L-shaped groove is formed in a transmission housing. In another aspect of the present invention, a pair of locating rings is disposed in the L-shaped groove. In yet another aspect of the present invention, the locating rings consist of a narrow ring and a wide ring.

In still another aspect of the present invention, the narrow locating ring is aligned to contact the backing plate of one torque transmitting mechanism. In yet still another aspect of the present invention, the wide locating ring is aligned to contact the backing plate of the other torque transmitting mechanism. In a further aspect of the present invention, the backing plate of the one torque transmitting mechanism has an annular extension aligned with the narrow locating ring. In a yet further aspect of the present invention, the backing plate of each torque transmitting mechanism is axially moveable without interference from the locating ring of the other torque transmitting mechanism.

DESCRIPTION OF AN EXEMPLARY EMBODIMENT

Figure 1:
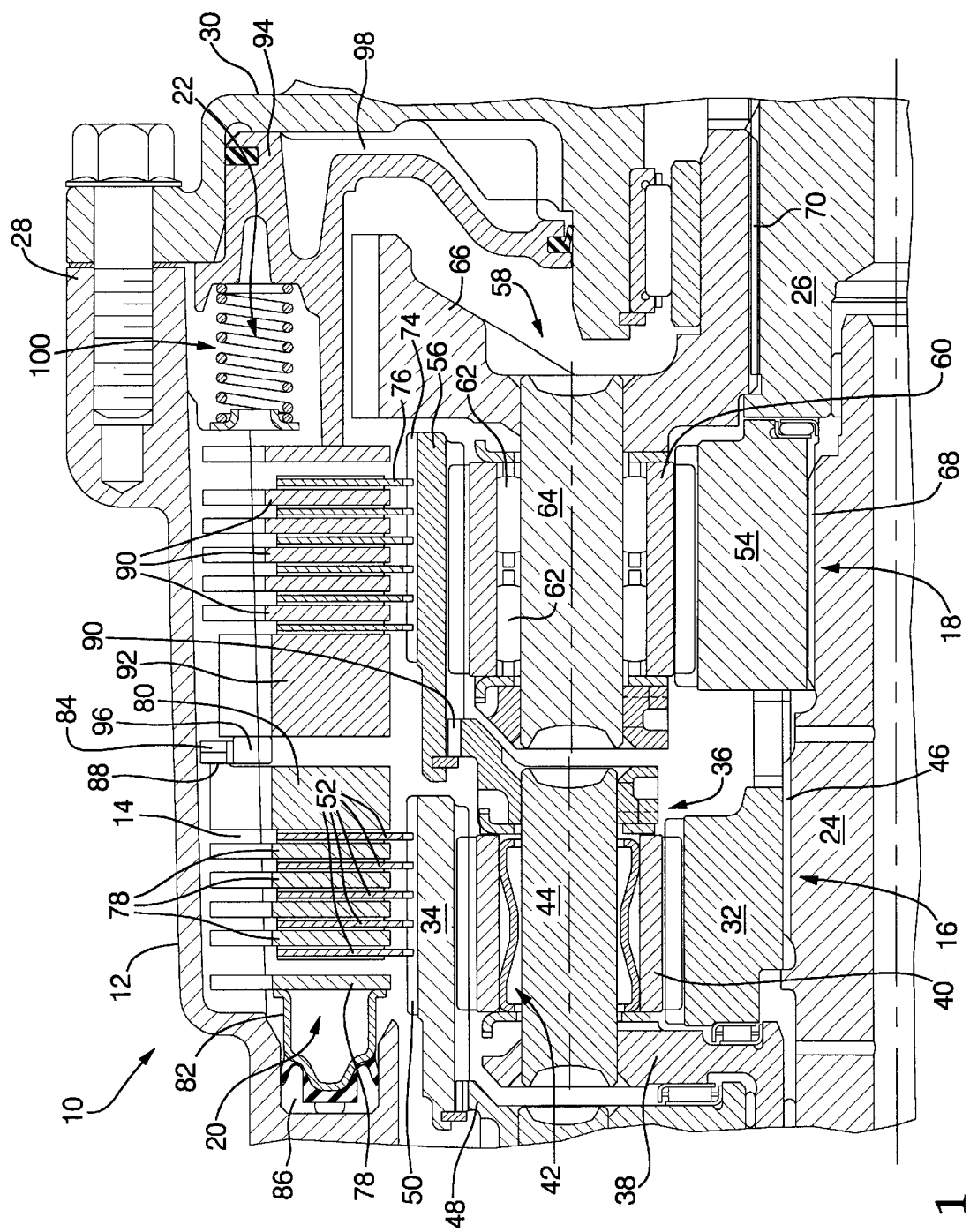
FIG. 1 is a sectional elevational view of a portion of a transmission incorporating the resent invention.
Figure 2:
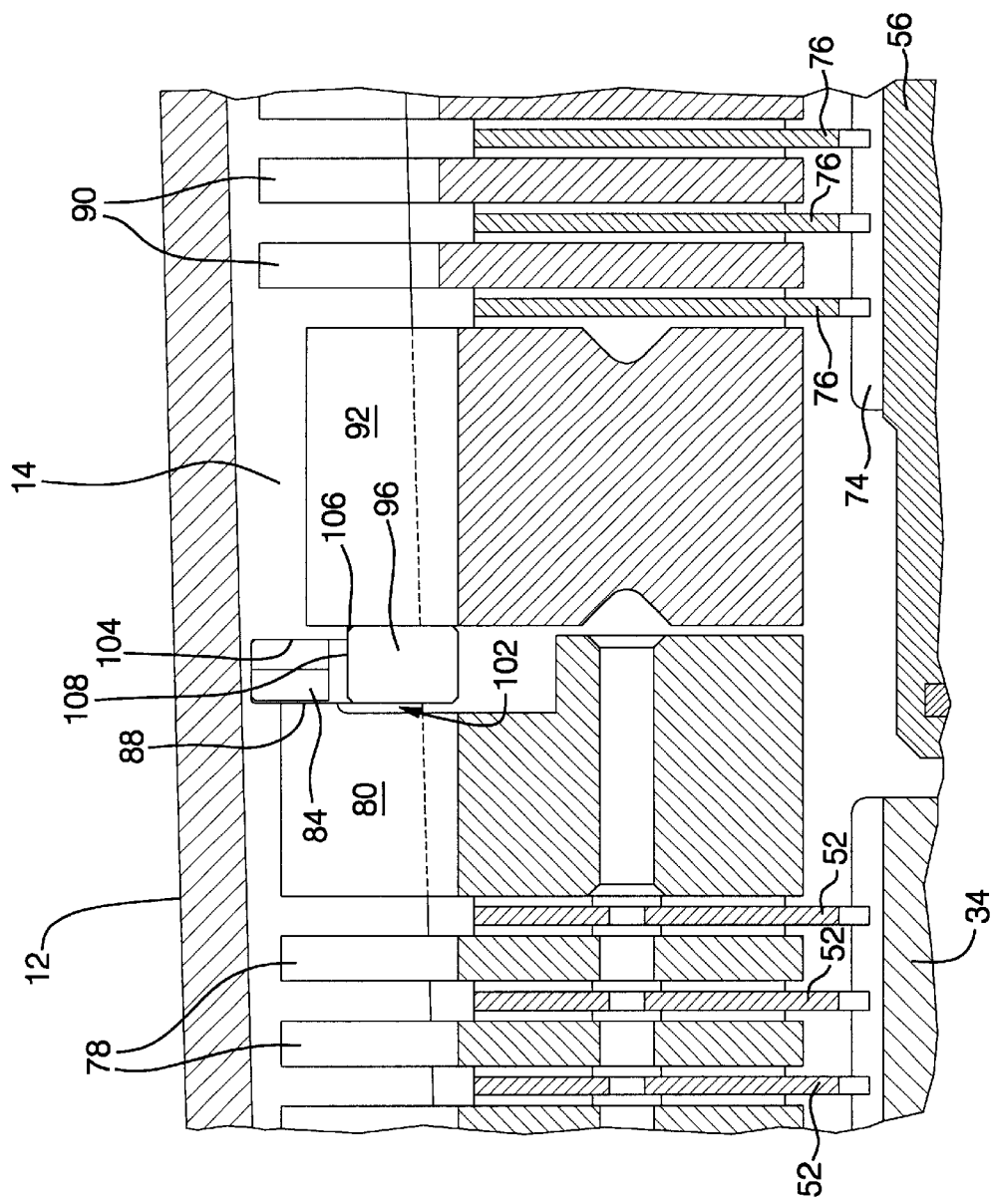
FIG. 2 is a enlarged view of a portion of FIG. 1.

Referring to the drawings wherein like characters represent the same or corresponding part throughout the several views there is seen particularly in FIGS. 1 and 2 a portion of a power transmission 10. The transmission 10 includes a housing 12 having a splined interior portion 14. Enclosed with in the housing 12 are a pair of planetary gear sets 16 and 18, a pair of selectively engageable torque transmitting mechanisms 20 and 22, an input shaft 24 and an output shaft 26. A cover 30 closes one end 28 of the housing 12. The selectively engageable torque transmitting mechanisms are controlled to be engaged and disengaged by a conventional electro-hydraulic control unit, not shown.

The planetary gear set 16 includes a sun gear member 32, a ring gear member 34 and a planetary carrier assembly member 36. The planetary carrier assembly member 36 has a cage 38 in which a plurality of pinion gears 40 are rotatably mounted on a needle bearing 42 supported on pins 44. The pinion gears 40 mesh with both the sun gear member 32 and the ring gear member 34 in a well-known manner. The sun gear member 32 is drivingly connected through a spline 46 with the input shaft 24. The ring gear member 34 is drivingly connected with a hub 48 and has a splined outer periphery 50 that is drivingly connected with a plurality of friction plates or discs 52 that are members of the torque transmitting mechanism 20.

The planetary gear set 18 includes a sun gear member 54, a ring gear member 56 and a planetary carrier assembly member 58 which consists of a plurality of pinion gears 60 rotatably mounted on needle bearings 62 supported on pins 64 that are secured in a cage 66. The sun gear member 54 is drivingly connected with the input shaft 24 through a spline connection 68. The planetary carrier assembly member 58 is connected to the output shaft 26 through a spline connection 70 between the cage 66 and the output shaft 26. The ring gear member 56 is drivingly connected with the planetary carrier assembly member 36 through a spline connection 72 and the ring gear member 56 has a splined outer periphery 74 that is drivingly connected with a plurality of friction plates or discs 76 that are members of the torque transmitting mechanism 22.

The torque transmitting mechanism 20 also includes a plurality of friction discs of plates 78, a backing plate 80 and an apply piston 82. The friction discs 78 are alternated axially with the friction plates 52 and are drivingly connected with the housing 12 at the spline portion 14. The backing plate 80 is also splined to the housing 12 at the spline portion 14. The friction discs 78 and backing plate 80 are free to move axially along the spline portion 14. A locating ring 84 limits rightward axial movement of the backing plate 80. Leftward movement of the friction discs 52, 78 is limited by the piston 82. The piston 82 is slidably disposed in a chamber 86 that is selectively supplied with pressurized fluid through a passage, not shown. When fluid pressure is supplied to the chamber 86, the piston 82 is moved axially to enforce frictional engagement between the friction discs 78 and the friction plates 52. The frictional engagement of these members will restrain the ring gear member 34 from rotating. The backing plate 80 has a segmented annular extension 88 aligned with the locating ring 84. The segmented annular extension 88 is interrupted by the spline 14. Abutment between the extension 88 and the locating ring 84 limits the axial movement of the torque transmitting mechanism 20 during engagement.

The torque transmitting mechanism 22 includes the friction plates 76, a plurality of friction discs or plates 90, a backing plate 92 and an apply piston 94. The friction plates 76 are alternated axially with the friction discs 88, which are splined to the housing 12 at the spline 14. A locating ring 96 limits the leftward axial movement of the backing plate 92 and therefore the torque transmitting mechanism 22. The piston 94 has an annular extension that is aligned with one of the friction discs 90 to limit the rightward movement of the torque transmitting mechanism 22 during disengagement. The piston 94 is slidably disposed in a chamber 98, formed in the cover 30, that is selectively supplied with fluid through a passage, not shown. A return spring assembly 100 urges the apply piston 94 into the chamber 98 during disengagement. When the chamber 98 is supplied with fluid under pressure, the piston 94 will be moved axially to enforce frictional engagement of the friction plates 76 and the friction discs 90 to engage the torque transmitting mechanism 22 and thereby inhibit rotation of the ring gear member 56. During engagement of the torque transmitting mechanism 22, the backing plate 92 reacts against the locating ring 96 to limit the leftward movement of the torque transmitting mechanism 22.

Figure 3:
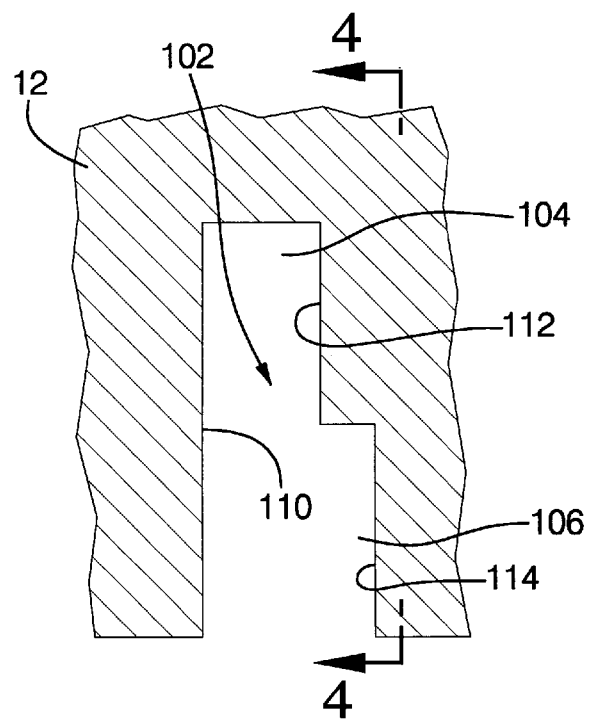
FIG. 3 is a view of a locating ring groove.
Figure 4:
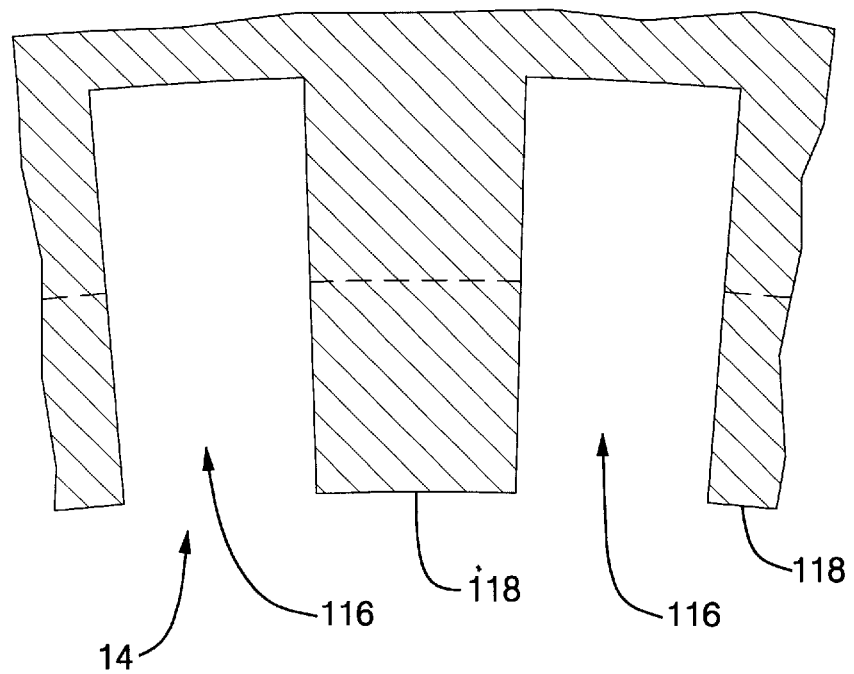
FIG. 4 is a view taken along line 4—4 in FIG. 3.

The locating rings 84 and 96 are positioned in an L-shaped groove 102. As best seen in FIGS. 3 and 4, the L-shaped groove 102 has an upstanding leg portion 104 and a horizontal leg portion 106. The locating ring 84 is positioned in the upstanding leg portion 104. The locating ring 96 has an outer perimeter 108, a portion of which abuts the outer perimeter of the leg portion 106. The groove 102 has a left side wall 110 that limits leftward movement of both locating rings 84 and 96, an outer right side wall 112 that limits rightward movement of the locating ring 84, and a lower right side wall 114 that limits rightward movement of the locating ring 96. The groove 102 is interrupted by the spaces 116 between the spline teeth 118 of the spline 14.

The main body of the backing plate 80, due to the segmented annular extension 88, is positioned rightwardly by the locating ring 84 and cannot contact the locating ring 96. The backing plate 80 cannot therefore influence nor be influenced by the backing plate 92. The locating ring 96 and therefore backing plate 92 is limited in leftward position by the wall 110 and will not contact the locating ring 84 due to the width of the locating ring 96. This permits the torque transmitting mechanism 20 and 22 to be controlled independently of each other during a ratio interchange. If the torque transmitting mechanism 20 is the oncoming torque transmitting mechanism, the rightward movement of the backing plate 80 is limited by the locating ring 84 independently of the locating ring 96 or the backing plate 92. The disengagement of the torque transmitting mechanism 22 is also independent of the movement of the backing plate 80. During a ratio interchange when torque transmitting mechanism 22 is the oncoming mechanism and torque transmitting mechanism 20 is the offgoing mechanism, there is no interaction between the backing plates 80 and 92 and their respective locating rings 84 and 96. This locating ring and backing plate structure allows the electronic control of the transmission to provide consistent shift feel and proper adaptive control when necessary.

What is claimed is:

1. A power transmission comprising:

a transmission housing having a splined surface formed therein;

a first torque transmitting mechanism having a first backing plate slidably disposed on said splined surface and having an axially extending annular abutment surface adjacent an outer perimeter thereof;

a second torque transmitting mechanism having a second backing plate slidably disposed on said splined surface in facing relation with said first backing plate;

a groove formed in said splined surface positioned between said first and second backing plates, said groove having an outer cylindrical portion and an inner cylindrical portion, said inner cylindrical portion being wider than said outer cylindrical portion;

a first locating ring secured in said outer cylindrical portion in axial alignment with said annular abutment surface and cooperating therewith to limit axial movement thereof during engagement of said first torque transmitting mechanism; and a second locating ring secured in said inner cylindrical portion in axial alignment with a portion of said second backing plate to limit axial movement thereof during engagement of said second torque transmitting mechanism and preventing abutment of said first and second backing plates during engagement of said second torque transmitting mechanism.

2. The power transmission defined in claim 1 further comprising:

said axially extending annular abutment surface cooperating with said first locating ring to prevent abutment of said first backing plate and said second locating ring during engagement of said first torque transmitting mechanism.

3. A power transmission comprising:

a housing having an interior splined portion, and an annular groove interrupting said splined portion, said groove having an outer portion and an inner portion, said inner portion being wider than said outer portion;

a first selectively engageable torque transmitting mechanism having a backing plate slidably disposed on said splined portion adjacent said groove, said backing plate having an axially extending annular abutment portion facing said groove;

a second selectively engageable torque transmitting mechanism having a backing plate slidably disposed on said spline portion adjacent said groove and spaced from said backing plate of said first selectively engageable torque transmitting mechanism;

a first locating ring positioned in said outer portion in axial alignment with said abutment portion of said backing plate of said first selectively engageable torque transmitting mechanism and limiting axial movement of said backing plate in a first direction during engagement of said first selectively engageable torque transmitting mechanism;

a second locating ring positioned in said inner portion in axial alignment with said backing plate of said second selectively engageable torque transmitting mechanism and limiting axial movement of said backing plate in a second direction during engagement of said second selectively engageable torque transmitting mechanism, said abutment portion preventing contact between said backing plate of said first selectively engageable torque transmitting mechanism and said second locating ring, and said second locating ring being of sufficient width to prevent contact between said backing plate of said second selectively engageable torque transmitting mechanism and said first locating ring.

* * * * *